(12) United States Patent
Ghobadi et al.

(10) Patent No.: US 9,391,884 B2
(45) Date of Patent: Jul. 12, 2016

(54) CONSISTENT HASHING USING EXACT MATCHING WITH APPLICATION TO HARDWARE LOAD BALANCING

(71) Applicant: Google Inc., Mountain View, CA (US)

(72) Inventors: Monia Ghobadi, Mountain View, CA (US); Alexander Shraer, San Francisco, CA (US)

(73) Assignee: Google Inc., Mountain View, CA (US)

( * ) Notice: Subject to any disclaimer, the term of this patent is extended or adjusted under 35 U.S.C. 154(b) by 101 days.

(21) Appl. No.: 14/169,776

(22) Filed: Jan. 31, 2014

(65) Prior Publication Data

US 2015/0222532 A1  Aug. 6, 2015

(51) Int. Cl.
*H04L 12/28* (2006.01)
*H04L 12/741* (2013.01)
*H04L 29/08* (2006.01)

(52) U.S. Cl.
CPC ............ *H04L 45/54* (2013.01); *H04L 67/1004* (2013.01)

(58) Field of Classification Search
USPC ................. 370/236–255, 392–395, 401–429; 709/203–229
See application file for complete search history.

(56) References Cited

U.S. PATENT DOCUMENTS

| 6,185,619 | B1 | | 2/2001 | Joffe et al. | |
|---|---|---|---|---|---|
| 6,424,650 | B1 | * | 7/2002 | Yang et al. | 370/390 |
| 6,556,541 | B1 | | 4/2003 | Bare | |
| 6,667,980 | B1 | * | 12/2003 | Modi et al. | 370/395.32 |
| 6,735,198 | B1 | * | 5/2004 | Edsall et al. | 370/389 |
| 6,742,045 | B1 | * | 5/2004 | Albert et al. | 709/238 |
| 6,807,172 | B1 | * | 10/2004 | Levenson et al. | 370/389 |
| 7,251,217 | B2 | | 7/2007 | Wong et al. | |
| 8,266,216 | B2 | * | 9/2012 | Rusitschka et al. | 709/206 |
| 8,908,527 | B2 | * | 12/2014 | Boutros et al. | 370/236 |
| 2002/0186695 | A1 | * | 12/2002 | Schwartz et al. | 370/392 |
| 2005/0165885 | A1 | * | 7/2005 | Wong | 709/201 |
| 2007/0076709 | A1 | * | 4/2007 | Mattson et al. | 370/389 |
| 2013/0148505 | A1 | | 6/2013 | Koponen et al. | |

(Continued)

FOREIGN PATENT DOCUMENTS

EP  1 094 645  4/2001

OTHER PUBLICATIONS

International Search Report and Written Opinion mailed Feb. 20, 2015 in PCT Application No. PCT/US2014/064823.

(Continued)

*Primary Examiner* — Man Phan
(74) *Attorney, Agent, or Firm* — John D. Lanza; Foley & Lardner LLP

(57) ABSTRACT

Aspects and implementations of the present disclosure are directed to a network device storing an address table. Each of the address table entries is assigned to a respective provisioned index value and an instance of a distributed service. The device is configured to add a new service instance to the address table by obtaining an assignable index value for the new service instance, identifying an assigned index value that is a companion index value to the obtained index value, dividing a packet source address set associated with the companion index value into first and second address subsets, and assigning the first address subset to the service instance entry in the address table associated with the assigned companion index value and the second address subset to an entry in the address table associated with the obtained index value and the newly added service instance.

21 Claims, 7 Drawing Sheets

(56) References Cited

U.S. PATENT DOCUMENTS

2015/0098470 A1* 4/2015 Sun .............................. 370/392
2015/0156108 A1* 6/2015 Shi .............................. 370/326

OTHER PUBLICATIONS

Engel et al., Aquila: Adaptive Resources Control for QoS Using an IP-Based Layered Architecture, IEEE Communications Magazine, pp. 46-53 (Jan. 2003).

Jain et al., B4: Experience with a Globally-Deployed Software Defined WAN, In Proceedings of the ACM SIGCOMM 2013 Conference on SIGCOMM, ACM, pp. 3-14 (Aug. 2013).

Karger et al., Consistent Hashing and Random Trees: Distributed Caching Protocols for Relieving Hot Spots on the World Wide Web, In Proceedings of the twenty-ninth annual ACM symposium on Theory of computing, ACM, pp. 654-663, (May 1997).

Yap et al., Towards Software Friendly Networks, Proceedings of the first ACM asia-pacific workshop on Workshop on systems, ACM, pp. 49-54, (Aug. 2010).

Ledlie et al., Distributed, Secure Load Balancing with Skew, Heterogeneity, and Churn, INFOCOM 2005, 24th Annual Joint Conference of the IEEE Computer and Communications Societies. Proceedings IEEE, vol. 2, pp. 1419-1430, (Mar. 2005).

Stephens et al., Past: Scalable Ethernet for Data Centers, Proceedings of the 8th international conference on Emerging networking experiments and technologies, ACM, pp. 49-60 (Dec. 2012).

Wang, OpenFlow-Based Server Load Balancing Gone Wild, Proceedings of the 11th USENIX conference on Hot topics in management of internet, cloud, and enterprise networks and services. USENIX Association, pp. 1-6 (Mar. 2011).

* cited by examiner

| Index | End Bits | Result |
|---|---|---|
| 0 | 000 | A |
| 1 | 001 | B |
| 2 | 010 | C |
| 3 | x11 | D |
| 4 | 100 | E |
| 5 | 101 | F |
| 6 | 110 | G |
| 7 | | |

360

| Index | End Bits | Result |
|---|---|---|
| 0 | 000 | A |
| 1 | 001 | B |
| 2 | 010 | C |
| 3 | x11 | D |
| 4 | 100 | E |
| 5 | 101 | F |
| 6 | 110 | G |
| 7 |  |  |

462 → row 3

370

| Index | End Bits | Result |
|---|---|---|
| 0 | 000 | A |
| 1 | 001 | B |
| 2 | 010 | C |
| 3 | 011 | D |
| 4 | 100 | E |
| 5 | 101 | F |
| 6 | 110 | G |
| 7 | 111 | H |

474 → row 3; 476 → row 7

| Index | End Bits | Result |
|---|---|---|
| 0 | 000 | A |
| 1 | 001 | B |
| 2 | 010 | C |
| 3 | 011 | D |
| 4 | 100 | E |
| 5 | 101 | F |
| 6 | 110 | G |
| 7 | 111 | H |

472 → row 0

380

| Index | End Bits | Result |
|---|---|---|
| 0 | 0000 | A |
| 1 | x001 | B |
| 2 | x010 | C |
| 3 | x011 | D |
| 4 | x100 | E |
| 5 | x101 | F |
| 6 | x110 | G |
| 7 | x111 | H |
| 8 | 1000 | J |
| ... |  |  |

484 → row 0; 486 → row 8

Figure 4C

| 370 | | |
|---|---|---|
| Index | End Bits | Result |
| 0 | 000 | A |
| 1 | 001 | B |
| 2 | 010 | C |
| 3 | 011 | D |
| 4 | 100 | E |
| 5 | 101 | F |
| 6 | 110 | G |
| 7 | 111 | H |

574 → row 3; 576 → row 7

| 360 | | |
|---|---|---|
| Index | End Bits | Result |
| 0 | 000 | A |
| 1 | 001 | B |
| 2 | 010 | C |
| 3 | x11 | D |
| 4 | 100 | E |
| 5 | 101 | F |
| 6 | 110 | G |
| 7 | | |

562 → row 3

Figure 5B

CONSISTENT HASHING USING EXACT MATCHING WITH APPLICATION TO HARDWARE LOAD BALANCING

BACKGROUND

A distributed computing service can be provided to client devices by multiple instances of the computing service. Typically, a client device can interact with any one of the instances to access the distributed computing service. The instances of the computing service may be hosted by multiple computing devices and/or virtual servers. Load balancers distribute client requests across the multiple instances, so as to keep the multiple computing devices and/or virtual servers from becoming over-burdened.

Network devices generally process data packets based on address information associated with the data packets. For example, a router typically forwards a received data packet to a next network destination (a "next-hop") based on an address associated with the data packet, e.g., a destination address indicated in header information for the received data packet.

SUMMARY

In one aspect, the disclosure relates to a method of maintaining routing information for a distributed service provided by a plurality of service instances. The method includes providing an address table with a number of entries less than or equal to a number of index values in a set of provisioned index values, each of the entries assigned to a respective provisioned index value and an instance of a distributed service. The method includes adding a new service instance to the address table by obtaining an assignable index value to assign to the new service instance, identifying an assigned index value that is a companion index value to the obtained index value, dividing a packet source address set associated with the companion index value into a first address subset and a second address subset, and assigning the first address subset to the service instance entry in the address table associated with the assigned companion index value and the second address subset to an entry in the address table associated with the obtained index value and the newly added service instance. The method includes obtaining an assignable index value to assign to the new service instance by performing the operations of identifying an existing, unassigned, index value in the set of provisioned index values and, when there is no unassigned index value available, increasing the number of index values in the set of provisioned index values and selecting a newly provisioned index value. In some implementations, the method includes removing a service instance from the address table by identifying a third address subset assigned to a service instance entry in the address table, associated with a first index value, for the service instance to be removed; identifying a fourth address subset assigned to a service instance entry in the address table associated with a second index value that is a companion index value to the first index value; assigning a combined address subset, which is the third address subset and the fourth address subset, to the service instance entry in the address table associated with the second index value; and clearing the service instance entry associated with the first index value from the table.

In one aspect, the disclosure relates to a network device controller. The network device controller includes memory storing an address table with a number of entries less than or equal to a number of index values in a set of provisioned index values. Each of the entries is assigned to a respective provisioned index value and an instance of a distributed service.

The network device controller includes at least one processor configured to add a new service instance to the address table by performing the operations of obtaining an assignable index value to assign to the new service instance, identifying an assigned index value that is a companion index value to the obtained index value, dividing a packet source address set associated with the companion index value into a first address subset and a second address subset, and assigning the first address subset to the service instance entry in the address table associated with the assigned companion index value and the second address subset to an entry in the address table associated with the obtained index value and the newly added service instance. The at least one processor is configured to obtain an assignable index value to assign to the new service instance by performing the operations of identifying an existing, unassigned, index value in the set of provisioned index values and, when there is no unassigned index value available, increasing the number of index values in the set of provisioned index values and selecting a newly provisioned index value. In some implementations, the at least one processor is configured to remove a service instance from the address table by performing the operations of identifying a third address subset assigned to a service instance entry in the address table, associated with a first index value, for the service instance to be removed; identifying a fourth address subset assigned to a service instance entry in the address table associated with a second index value that is a companion index value to the first index value; assigning a combined address subset, which is the third address subset and the fourth address subset, to the service instance entry in the address table associated with the second index value; and clearing the service instance entry associated with the first index value from the table.

In one aspect, the disclosure relates to tangible computer readable storage media storing non-transient processor-executable instructions that, when executed by a computing device comprising the storage media and one or more processors, cause the one or more processors to perform the operations of storing, in computer readable memory, an address table with a number of entries less than or equal to a number of index values in a set of provisioned index values, each of the entries assigned to a respective provisioned index value and an instance of a distributed service. The instructions cause the one or more processor to add a new service instance to the address table by obtaining an assignable index value to assign to the new service instance, identifying an assigned index value that is a companion index value to the obtained index value, dividing a packet source address set associated with the companion index value into a first address subset and a second address subset, and assigning the first address subset to the service instance entry in the address table associated with the assigned companion index value and the second address subset to an entry in the address table associated with the obtained index value and the newly added service instance. The instructions cause the one or more processor to obtain an assignable index value to assign to the new service instance by performing the operations of identifying an existing, unassigned, index value in the set of provisioned index values and, when there is no unassigned index value available, increasing the number of index values in the set of provisioned index values and selecting a newly provisioned index value. In some implementations, the instructions cause the one or more processor to remove a service instance from the address table by identifying a third address subset assigned to a service instance entry in the address table, associated with a first index value, for the service instance to be removed; identifying a fourth address subset assigned to a service instance entry in the address table associated with a second index value that is a companion index value to the first index value; assigning a combined address subset, which is the third address subset and the fourth address subset, to the service instance entry in the address table associated with the second index value; and clearing the service instance entry associated with the first index value from the table.

BRIEF DESCRIPTION OF THE DRAWINGS

The above and related objects, features, and advantages of the present disclosure will be more fully understood by reference to the following detailed description, when taken in conjunction with the following figures, wherein:

FIGS. 4B and 4C are diagrams illustrating examples of adding a new service instance to a table;

FIG. 5B is a diagram illustrating an example of removing a service instance from a table.

Like reference numbers and designations in the various drawings indicate like elements.

DETAILED DESCRIPTION

Aspects and implementations of the present disclosure generally relate to load balancing. Generally, requests to a distributed service may be load balanced by routing different requests to different instances of the service. The different instances may be hosted on different physical or virtual server hosts. A network device, such as a switch or router, in a network path determines the service instance to which a particular request should be forwarded. The network device can implement a set of load-balancing rules that are applied to each incoming packet. In some implementations, all of the traffic being load-balanced arrives at the network device addressed to the same destination address, e.g., a virtual address for the distributed service. Load-balancing rules may be implemented in a manner similar to a destination-based routing table, except that the load-balancing rules route traffic based on a characteristic, such as a source address, of incoming packets that can serve as a consistent identifier. In some implementations, the load-balancing rules route data packets from a client to a particular host for an instance of the distributed service selected based on the last few (the least significant) bits of the client's 32-bit IPv4 network address. The load-balancing rules may be selected so that adding new service instances, and removing service instances, has minimal impact on the existing routes and route tables.

Figure 1A:
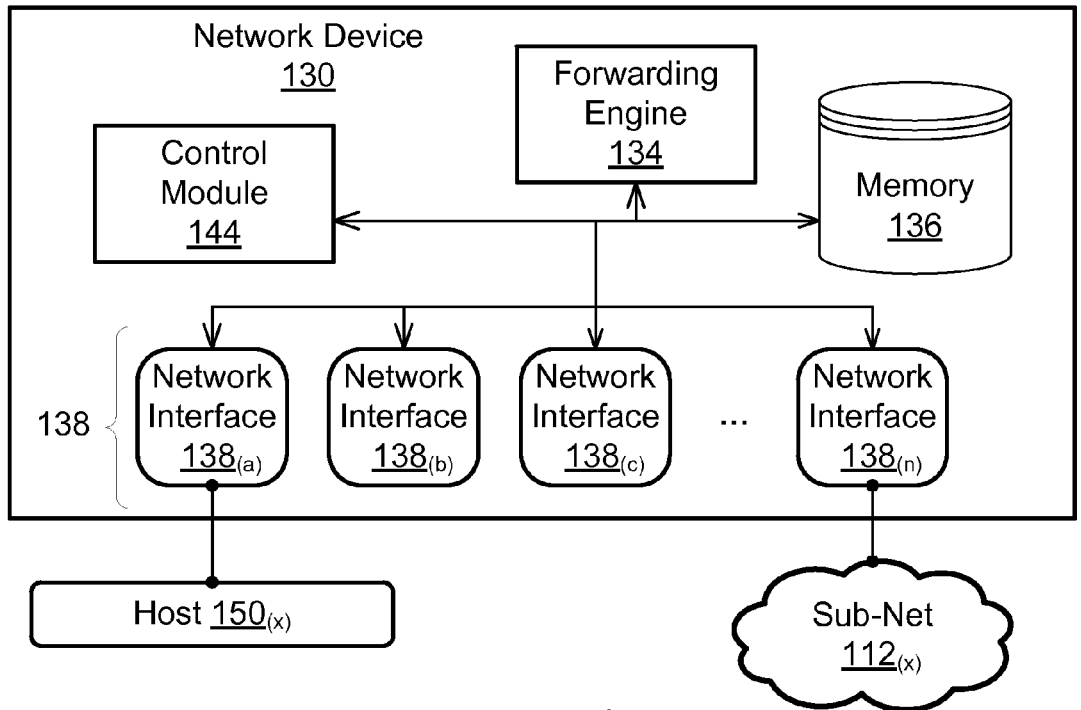
FIG. 1A is a block diagram of an example network device.
Figure 1B:
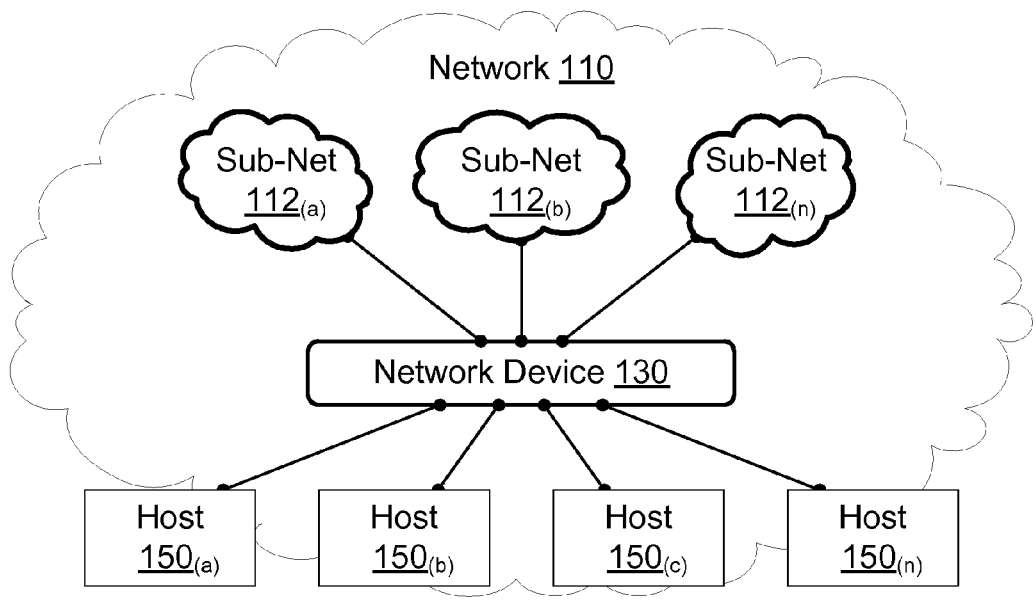
FIG. 1B is a block diagram of an example network device connecting multiple hosts for a distributed service to a broader data network.

FIG. 1A is a block diagram of an example network device 130. FIG. 1B is a block diagram of an example network device 130 connecting multiple hosts 150a-150n for a distributed service to a broader data network 110. In broad overview, the illustrated network device 130 has a control module 144 and a forwarding engine 134. The control module maintains the aforementioned rules in a memory 136 for use by the forwarding engine 134 in processing data packets. The network device 130 has a plurality of network interfaces 138, with one or more of the network interfaces 138 linked to other network devices in various subnets 112a-112n of a data network 110 and/or hosts 150a-150n.

In more detail, the network device 130 participates in the data network 110 by receiving and sending data packets via the network interfaces 138. Each network interface 138 may be connected to other network devices, e.g., via a data plane. In some implementations, the connections are bi-directional data links. In some implementations, the connections are uni-directional data links, where each link is either ingress or egress. The other network devices send data packets to the network device 130, which may then forward them to another network device according to its configuration (e.g. rules or routing information stored in memory 136). For example, a data packet may arrive at the network device 130 via a first interface (e.g., network interface 138a), causing the network device 130 to process the received data packet and (for example) forward it to an appropriate next-hop via a second interface (e.g., network interface 238b). The forwarding engine 134 determines which network interface 138 to use to forward each data packet received.

The data network 110 is a network facilitating interactions between computing devices. An illustrative example data network 110 is the Internet; however, other networks may be used. The data network 110 may be composed of multiple connected sub-networks 112a-112n. The data network 110 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. The data network 110 may be any type and/or form of data network and/or communication network. The data network 110 may be public, private, or a combination of public and private networks. In general, the data network 110 is used to convey information between computing devices, and the network device 130 facilitates this communication according to its configuration.

The network device 130 includes a control module 144 and memory 136 storing configuration data, rules, and/or routing data. In some implementations, the control module 144 is implemented as a special purpose circuit (e.g., an ASIC). In some implementations, the control module 144 is implemented as a set of computer executable instructions stored in computer accessible memory and executed by one or more computing processors. The network device control module 144 receives configuration and routing information and updates the configuration and routing data stored in memory 136. In some implementations, the control module 144 receives routing data from other network devices in the network 110, e.g., using ICMP or BGP messages. In some implementations, the control module 144 creates and maintains the data structures described herein, using the received routing data. In some implementations, the network device 130 participates in a software-defined network ("SDN") and the network device control module 144 receives configuration and routing information from an SDN controller, e.g., via a control plane. In some such implementations, the control module 144 receives the load-balancing rules described herein from an SDN controller. In general, the control module 144 stores these load-balancing rules in the memory 136. The forwarding engine 134 uses the configuration and routing data in memory 136 to manage the data traffic at the network interface ports 138.

The network device memory 136 may be any device suitable for storing computer readable data. The memory 136 may be similar to the memory 670 or cache 675 illustrated in FIG. 6 and described below. Examples include, but are not limited to, semiconductor memory devices such as EPROM, EEPROM, SDRAM, and flash memory devices. A network device 130 may have any number of memory devices 136.

The forwarding engine 134 uses the rules, configuration, and routing data stored in memory 136 to manage the data traffic received at the network interfaces 138. In some implementations, the forwarding engine 134 is implemented as a special purpose circuit (e.g., an ASIC). In some implementations, the forwarding engine 134 is implemented as a set of computer executable instruction sets stored in computer accessible memory and executed by one or more computing processors. The forwarding engine 134 extracts address information from a data packet (e.g., an IP address from a packet header) and processes it to determine how to handle the data packet (e.g., whether to forward the data packet and/or which network interface 138 to use for forwarding the data packet) using the load-balancing rules and methods described herein.

The load-balancing rules route traffic based on a characteristic, such as a source address, of incoming packets that can serve as a consistent identifier. In some implementations, the load-balancing rules route data packets from a client to a particular host for an instance of the distributed service selected based on the last few (the least significant) bits of the client's 32-bit IPv4 network address. In some implementations, the load-balancing rules route data packets from a client to a particular host for an instance of the distributed service selected based on an identifier made up of multiple values, e.g., a source address and TCP source port. In some implementations, sets of addresses (or identifiers) are assigned to various instances of the distributed service. In general, the size of each set (that is, the number of addresses in each set) is roughly the same as the size of any other set. In some implementations, each set of addresses is either a first size or a second size that is half the first size. As new service instances are added, the sets that are the first size are split up such that the new service instance is assigned a set of address that is half the first size.

To achieve this distribution, a network controller treats each service instance as having a companion instance. When a new service instance is added, the network controller identifies the companion instance for the new service instance, and divides the set of addresses assigned to the companion instance into two sets, one for the preexisting companion instance and the other for the new service instance. When a service instance is removed, the network controller re-assigns the addresses for the removed service instance back to the companion instance. In some situations, the pairings between peer service instance companions is redistributed such that each service instance has a companion instance, as needed.

Each service instance is assigned or associated with an index used in identification of a companion instance. In general, each index value is paired with a companion index based on the total number of service instances. In some implementations, the pairing is based on the number of service instances k and the largest power of two less than the number of service instances (i.e., using $\rho$ to denote the exponent for a power of two, $2^\rho < k \leq 2^{\rho+1}$), where k is the number of service instances after adding a service instance or before removing a service instance. In some implementations, in precise mathematical terms, for a number of service instances k, each service instance of index r (starting at 0) is paired with a companion service instance of index c, where:

$$\rho = \lfloor \log_2 k - 1 \rfloor$$

$$c = r + 2^\rho \text{ modulo } 2^{\rho+1}$$

Figures 2, 3:
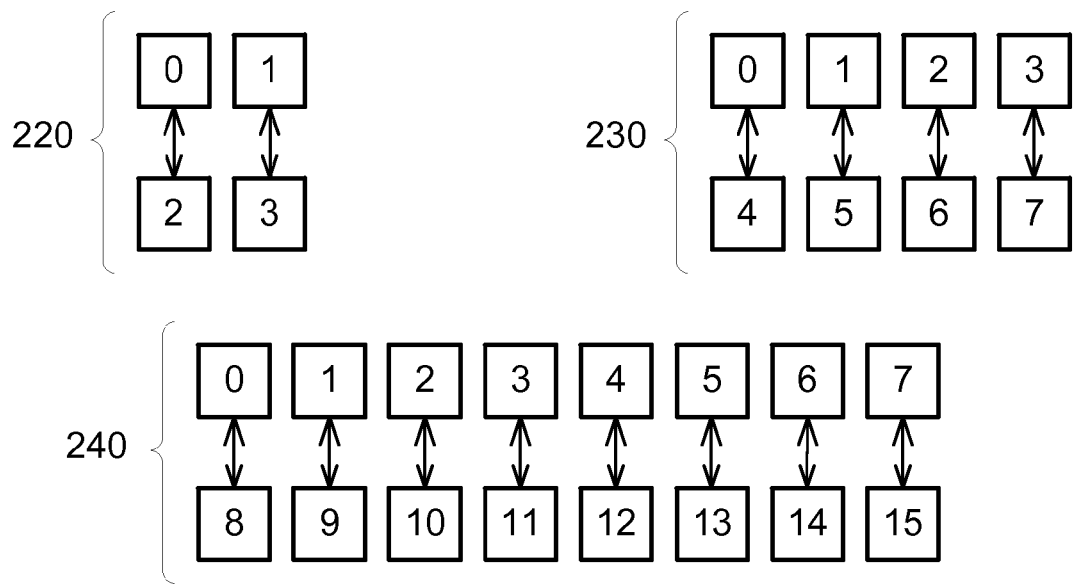
FIG. 2 is a block diagram of example index pairings.
FIG. 3 is a diagram illustrating an example table mapping sets of addresses to service instances.

FIG. 2 is a diagram of example index pairings. Illustrated are three sets of companion maps: a first map 220 for a set of four instances in two pairs, a second map 230 for a set of eight instances in four pairs, and a third map 240 for a set of sixteen instances in eight pairs. These maps (220, 230, and 240) are visual examples of the pairs calculated using the above equations. For example, for a range of three to four service instances, numbered 0 through 3, the first map 220 pairs 0 with 2 and 1 with 3. However, if a fifth instance is added (numbered 4), the range of three to four service instances is exceeded and would be expanded, e.g., to a range of five to eight service instances. The second map 230 illustrates that the newly added instance 4 would be paired with 0, which had been paired with 2 in the first map 220. Additional service instances may be added, up to the new threshold of eight instances. Index number 5 is paired with 1, index 6 is paired with 2, and index 7 (corresponding to the eighth service instance) is paired with 3. If a ninth instance is added (numbered 8), the range of five to eight service instances is exceeded and would be expanded, e.g., to a range of nine to sixteen service instances. The third map 240 illustrates that the newly added instance 8 would be paired with 0, which had been paired with 2 in the first map 220 and with 4 in the second map 230.

FIG. 3 is a diagram illustrating an example address table 360 mapping sets of addresses to service instances. In broad overview, the address table 360 maps seven sets of addresses to service instances. The table 360 is illustrated with rows of example data, where each row is an example rule for a service instance, and with three columns: Index, End Bits, and Result. The "Index" corresponds to the index numbers introduced above, starting at 0. The "Result" is a value designating how packets satisfying the rule are handled, e.g., a service instance identifier or a network interface identifier for forwarding the packets to a service instance. The "End Bits" values are binary numbers; an address matches a rule if it ends with the same bits as the rule's end bits value. An "x" in the bits indicates a bit that can be either a 1 or a 0, i.e., a "don't care" bit. For example, the row 362 has an End Bits value of "x11," indicating that any address with the last two bits equal to "11" would match. No other rule in the table 360 has an End Bits value ending in 11.

As shown in FIG. 3, the address table 360 includes entries for eight potential index value/address set pairings. These eight index values can be considered to be "provisioned" in the table. Seven of the eight entries are populated, having address sets assigned to the respective index values. One entry, associated with index value 7, is not assigned to any address set, and thus is available for assignment. While the table may include additional entries, with index values greater than 7, such entries are not considered assignable (and thus are not shown) given the limited number of entries needed to handle the active number of service instances. After the number of active instances exceeds a threshold (typically a number equal to a power of 2), additional entries and their respective index values are provisioned, and thus are made available for assignment.

In some implementations, each address set can be defined solely by the values of the addresses' least significant bits. The value of those bits are considered to inherently serve as an index value for the set of addresses. For example, all addresses with the last four significant bits of 0101 (i.e., 5) are considered to inherently be part of the address group associated with index number 5. Similarly, addresses with the last four significant bits of 0001, are inherently associated with the index number 1. In such implementations, no explicit address grouping allocation is necessary, and instead relies merely on the structure of the addresses themselves. The number of bits used to define these inherent address sets depends on the number of service instances the addresses are being split between.

In some implementations, each group is defined by a network address mask in CIDR notation and the group is split by adding an address mask selected to be halfway between two address masks (e.g., an average). Any approach may be used to describe the set of addresses associated with each service instance and to divide the set of addresses into smaller subsets.

Figure 4A:
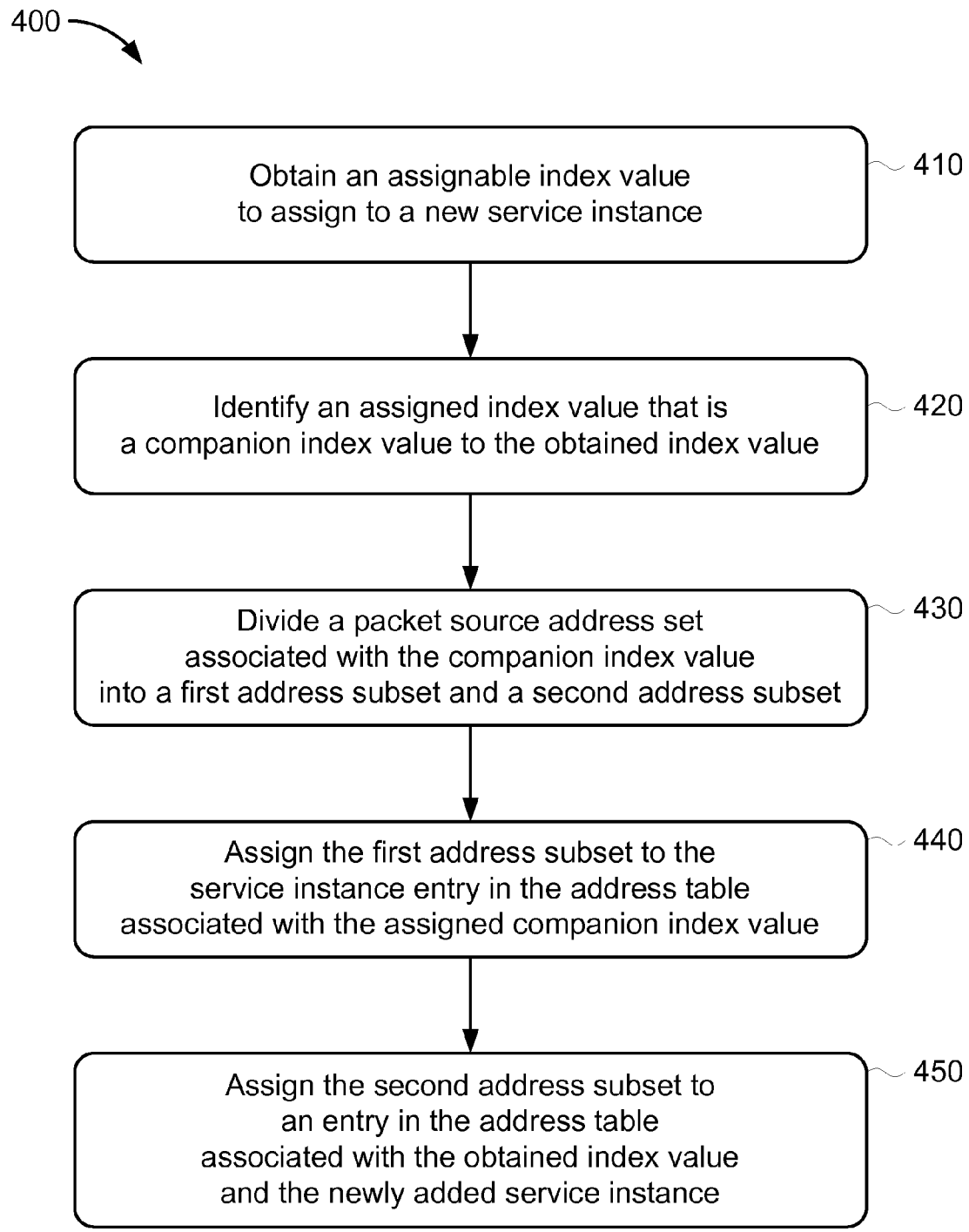
FIG. 4A is a flowchart for an example method in which a service instance is added to an address table.

FIG. 4A is a flowchart for an example method in which a service instance is added to an address table. In broad overview, a method 400 begins with a network device obtaining an assignable index value to assign to a new service instance (stage 410). The network device then identifies an assigned index value that is a companion index value to the obtained index value (stage 420) and divides a packet source-address set associated with the companion index value into a first address subset and a second address subset (stage 430). The network device assigns the first address subset to the service instance entry in the address table associated with the assigned companion index value (stage 440) and assigns the second address subset to an entry in the address table associated with the obtained index value and the newly added service instance (stage 450).

In more detail, the method 400 begins with a network device (e.g., the network device 130, illustrated in FIG. 1A) obtaining an assignable index value to assign to a new service instance (stage 410). The network device obtains an assignable index value by identifying an existing, unassigned index value in a set of provisioned index values. Index values are said to be provisioned if they are already assigned or are available for assignment. If there are no existing, unassigned, index values in the set of provisioned index values, the network device increases the number of index values in the set of provisioned index values and selects a newly provisioned index value. In some implementations, the network device increases the number of index values by doubling the number of index values provisioned and re-determining the pairing between service instance companions based on the new number of index values provisioned.

The network device then identifies an assigned index value that is a companion index value to the obtained index value (stage 420). As introduced above, in some implementations, the companion index value for a given index value is function of the given index value. That is, the companion index value c is determined as: $c = r + 2^\rho$ modulo $2^{\rho+1}$, where r is the given index value and $\rho$ is the exponent for the largest power of two less than or equal to the highest index value in use (that is, $\rho = \lfloor \log_2 k - 1 \rfloor$, where k is the total number of service instances and index values start at zero).

The network device divides a packet source-address set associated with the companion index value into a first address subset and a second address subset (stage 430). In some implementations, the division is equal, such that the first address subset and the second address subset are of the same size. As described above, addresses can be grouped into subsets sharing a common set of End Bits and "not caring" about the values of any higher order bits in the address (these "don't care" bits may be expressed as "x" bits). Such a grouping can be effectively split in half by increasing by one the number of bits in the set of End Bits that are specifically defined (i.e., which are not x bits). By the nature of the binary number system, the value of this bit for half of the addresses in the prior grouping will be 0 and for the other half will be 1. Thus a set of addresses can be split by converting the lowest order x bit in the End Bits to a 0 or a 1 and adding a corresponding new entry to the table where that bit is set to the other of 0 or 1. For example, a set of addresses defined by End bits xx001 can be split evenly into two groups with End Bits x0001 and x1001.

The network device then assigns the first address subset to the service instance entry in the address table associated with the assigned companion index value (stage 440) and assigns the second address subset to an entry in the address table associated with the obtained index value and the newly added service instance (stage 450). In some implementations, modifications to the address table can be limited under some situations to only modifying the entry in the address table at stage 440 and adding a new entry at stage 450. This enables a low impact change.

FIGS. 4B and 4C are diagrams illustrating examples of adding a new service instance to a table mapping sets of addresses to service instances. In broad overview, in FIG. 4B, the address table 360 first illustrated in FIG. 3 is modified to become an address table 370, which maps eight sets of address to service instances. Likewise, in FIG. 4C, the address table 370, which maps, eight sets of addresses to service instances is modified to become an address table 380, mapping nine sets of address to service instances. FIG. 4B illustrates a scenario wherein there is an available assignable index. FIG. 4C illustrates a scenario wherein there is no available assignable index.

In FIG. 4B, the address table 360 mapping seven sets of addresses to service instances is modified to become the address table 370 mapping eight sets of address to service instances. In more detail, a service instance "H" is added (e.g., using the method described above in reference to FIG. 4A). The new service instance is assigned index 7, which has a companion index of 3. The entry 462 for index 3 is a rule for addresses with the last two bits equal to "11." The table 360 is modified to become a table 370 with the new rule, in which the entry 474 for index 3 is a rule for addresses with the last three bits equal to "011" and the entry 476 for index 7 is a rule for addresses with the last three bits equal to "111."

In some implementations, when new indices are provisioned, the number of index values provisioned brings the total number of provisioned index values up the next highest power of 2. Thus, when a fifth index is provisioned (exceeding $2^2$), an additional four index values are provisioned to bring the total number of provisioned index values up to 8, i.e., $2^3$. When a ninth index value is needed, 8 additional index values are provisioned, bringing the total number to 16, i.e., $2^4$, and so forth. In this case, adding an eighth service instance does not require a total number of provisioned index values to exceed a power of 2, and thus no new index values are needed or provisioned.

In FIG. 4C, the address table 370, which maps eight sets of addresses to service instances is modified to become an address table 380, mapping nine sets of address to service instances. In more detail, a service instance "J" is added (e.g., using the method described above in reference to FIG. 4A). The new service instance is assigned index 8, which has a companion index of 0. The entry 472 for index 0 is a rule for addresses with the last three bits equal to "000." The table 370 is modified to become a table 380 with the new rule, in which the entry 484 for index 0 is a rule for addresses with the last four bits equal to "0000" and the entry 486 for index 8 is a rule for addresses with the last four bits equal to "1000." As indicated above, in some implementations, the number of indices provisioned at any given time is equal to a power of 2. Thus, adding a ninth service instance (9 being one greater than $2^3$) requires the provisioning of additional index values.

When provision the ninth index value, an additional seven index values are provisioned, as well, taking the total number of provisioned index values up to 16.

If a service instance is removed, e.g., using the method described below in reference to FIG. 5, then the address table is updated to re-combine the set of addresses for the removed service instance and its companion instance. If the removed service instance does not have a companion instance (e.g., "D" at index 3 in the table 380, illustrated in FIG. 3B) then the table may need to be rebuilt. Otherwise, only the rules for the removed service instance and its companion need to be updated. Thus, the number of entries that need to be modified for a topology change is minimal.

Figure 5A:
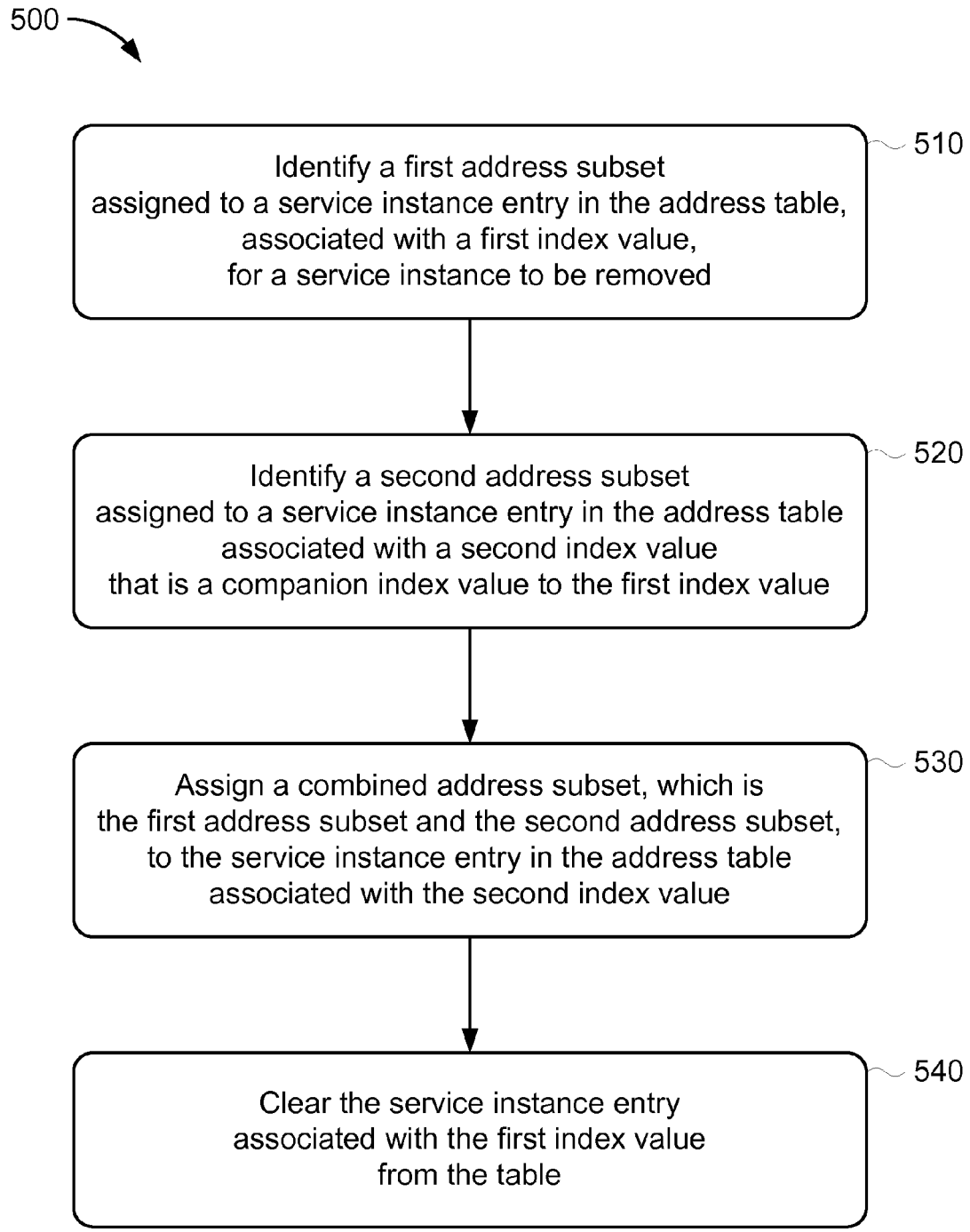
FIG. 5A is a flowchart for an example method in which a service instance is removed from an address table.

FIG. 5A is a flowchart for an example method in which a service instance is removed from a table. In broad overview, the method 500 begins with a network device identifying a first address subset assigned to a service instance entry in the address table, associated with a first index value, for a service instance to be removed (stage 510). The network device identifies a second address subset assigned to a service instance entry in the address table associated with a second index value that is a companion index value to the first index value (stage 520) and assigns a combined address subset to the service instance entry in the address table associated with the second index value (stage 530). The network device can then clear the service instance entry associated with the first index value from the table (stage 540).

In more detail, the method 500 begins with a network device identifying a first address subset assigned to a service instance entry in the address table, associated with a first index value, for a service instance to be removed (stage 510). A service instance may be removed, for example, in the event of a service failure, a host failure, or a communication link failure. If the distributed service is underutilized, one or more service instances may be shut down to consolidate service load.

The network device identifies a second address subset assigned to a service instance entry in the address table associated with a second index value that is a companion index value to the first index value (stage 520). As introduced above, in some implementations, the companion index value for a given index value is function of the given index value. That is, the companion index value c is determined as: $c=r+2^{\rho}$ modulo $2^{\rho+1}$, where r is the given index value and $\rho$ is the exponent for the largest power of two less than or equal to the highest index value in use (that is, $\rho=\lfloor \log_2 k-1 \rfloor$, where k is the total number of service instances prior to removing the service instance and index values start at zero).

The network device then assigns a combined address subset to the service instance entry in the address table associated with the second index value (stage 530) and clears the service instance entry associated with the first index value from the table (stage 540). In some implementations, the network device uses the lower value of the second index value and the first index value when assigning the combined address subset to a service instance entry in the address table. In some implementations, the combined address subset is created by transitioning a bit from each of the sub-groups being merged into a "don't care" bit (indicated with an x in FIG. 5B).

Thus, as described above, in some implementations where the number of service instances (k) is a power of two ($k=2^{\rho}$), the distribution is fair in that each service instance is associated with the same number (1/k) of the source addresses. Where the number of service instances (k) is between two powers of two ($2^{\rho}<k<2^{\rho+1}$), in some implementations, there is some imbalance in the distribution—some service instances will be associated with a number of addresses that is twice the number associated with other service instances. In particular, the percentage of addresses ($1/2^{\rho+1}$) assigned to $2(k-2\rho)$ service instances will be half the percentage of addresses ($1/2^{\rho}$) assigned to the remaining $2^{\rho+1}-k$ service instances.

In FIG. 5B, an address table 370 mapping eight sets of address to service instances is modified to become an address table 360 mapping seven sets of addresses to service instances. In more detail, a service instance "H" is removed (e.g., using the method described above in reference to FIG. 5A). The service instance being removed was assigned index 7, which has a companion index of 3. The entry 576 for index 7 is a rule for addresses with the last three bits equal to "111," and the entry 574 for index 3 is a rule for addresses with the last three bits equal to "011." The table 370 is modified to become a table 360, in which the entry 562 for index 3 is a combined rule for addresses with the last three bits equal to "011" or "111" and there is no entry for index 7, i.e., the rule at index 7 has been cleared.

Figure 6:
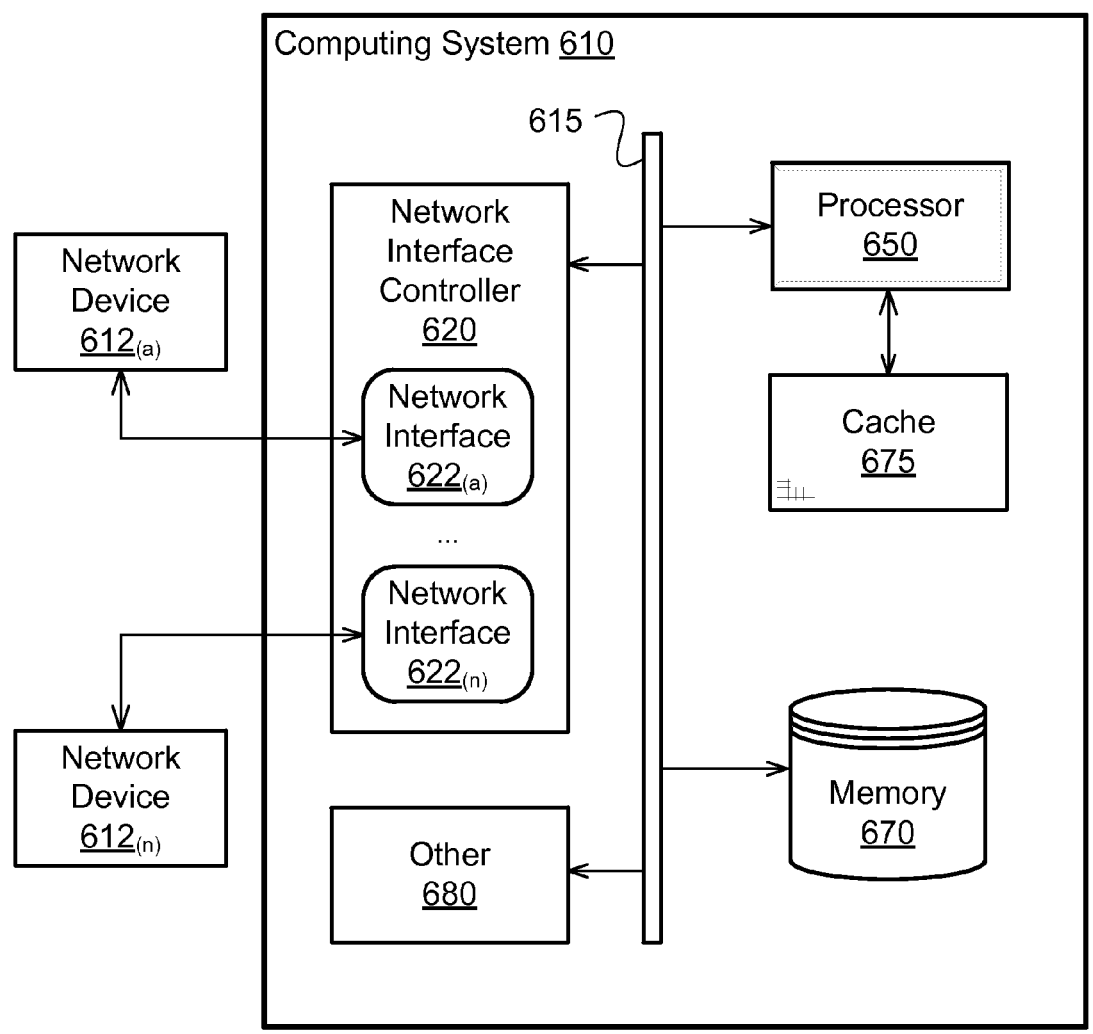
FIG. 6 is a block diagram of a computing system in accordance with an illustrative implementation.

FIG. 6 is a block diagram of a computing system for use in implementing the computerized components described herein, in accordance with an illustrative implementation. In broad overview, the computing system includes at least one processor 650 for performing actions in accordance with instructions and one or more memory devices 670 or 675 for storing instructions and data. The illustrated example computing system 610 includes one or more processors 650 in communication, via a bus 615, with at least one network interface controller 620 with network interface ports $622_{(a-n)}$ connecting to network devices $612_{(a-n)}$, memory 670, and any other devices 680, e.g., an I/O interface. Generally, a processor 650 will execute instructions received from memory. The processor 650 illustrated incorporates, or is directly connected to, cache memory 675.

In more detail, the processor 650 may be any logic circuitry that processes instructions, e.g., instructions fetched from the memory 670 or cache 675. In many embodiments, the processor 650 is a microprocessor unit or special purpose processor. The computing device 610 may be based on any processor, or set of processors, capable of operating as described herein. The processor 650 may be a single core or multi-core processor. The processor 650 may be multiple processors.

The memory 670 may be any device suitable for storing computer readable data. The memory 670 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, and Blu-Ray® discs). A computing system 610 may have any number of memory devices 670.

The cache memory 675 is generally a form of computer memory placed in close proximity to the processor 650 for fast read times. In some implementations, the cache memory 675 is part of, or on the same chip as, the processor 650. In some implementations, there are multiple levels of cache 675, e.g., L2 and L3 cache layers.

The network interface controller 620 manages data exchanges via the network interfaces $622_{(a-n)}$ (also referred to as network interface ports). The network interface controller 620 handles the physical and data link layers of the OSI model for network communication. In some implementations, some of the network interface controller's tasks are handled by the processor 650. In some implementations, the network interface controller 620 is part of the processor 650. In some implementations, a computing system 610 has multiple network interface controllers 620. The network interfaces 622$_{(a-n)}$ are connection points for physical network links. In some implementations, the network interface controller 620 supports wireless network connections and an interface port 622 is a wireless receiver/transmitter. Generally, a computing device 610 exchanges data with other computing devices 612$_{(a-n)}$ via physical or wireless links to a network interface 622$_{(a-n)}$. In some implementations, the network interface controller 620 implements a network protocol such as Ethernet.

The other computing devices 612$_{(a-n)}$ are connected to the computing device 610 via a network interface port 622. The other computing devices 612$_{(a-n)}$ may be peer computing devices, network devices, or any other computing device with network functionality. For example, a first computing device 612$_{(a)}$ may be a network device such as a hub, a bridge, a switch, or a router, connecting the computing device 610 to a data network such as the Internet.

The other devices 680 may include an I/O interface, external serial device ports, and any additional co-processors. For example, a computing system 610 may include an interface (e.g., a universal serial bus (USB) interface) for connecting input devices (e.g., a keyboard, microphone, mouse, or other pointing device), output devices (e.g., video display, speaker, or printer), or additional memory devices (e.g., portable flash drive or external media drive). In some implementations, a computing device 610 includes an additional device 680 such as a co-processor, e.g., a math co-processor can assist the processor 650 with high precision or complex calculations.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed is:

1. A method of maintaining routing information for a distributed service provided by a plurality of service instances, comprising:

provrding an address table including a set of entries, wherein:

the address table has a number of entries less than or equal to a number of index values in a set of provisioned index values, and wherein each of the entries is assigned to a respective provisioned index value and an instance of the distributed service; and adding a new service instance to the address table by:
  obtaining, by a network device controller, an assignable index value to assign to the new service instance by 1) identifying an existing, unassigned, index value in the set of provisioned index values, or when no existing index values in the set of provisioned index values are unassigned, by 2) increasing the number of index values in the set of provisioned index values and selecting a newly provisioned index value;
  identifying, by the network device controller based on the obtained index value and the number of provisioned index values in the set of provisioned index values, an assigned index value that is a companion index value to the obtained index value, wherein the companion index value is associated with a packet source address set;
  dividing, by the network device controller, the packet source address set associated with the companion index value into a first address subset and a second address subset; and
  assigning, by the network device controller, the first address subset to the service instance entry in the address table associated with the companion index value and the second address subset to an entry in the address table associated with the obtained index value and the newly added service instance.

2. A method comprising:
providing an address table including a set of entries, wherein:
  the address table has a number of entries less than or equal to a number of index values in a set of provisioned index values, and wherein each of the entries is assigned to a respective provisioned index value and an instance of the distributed service;
adding a new service instance to the address table by:
  obtaining, by a network device controller, an assignable index value to assign to the new service instance by 1) identifying an existing, unassigned, index value in the set of provisioned index values, or by 2) increasing the number of index values in the set of provisioned index values and selecting a newly provisioned index value;
  identifying, by the network device controller, an assigned index value that is a companion index value to the obtained index value, wherein the companion index value is associated with a packet source address set;
  dividing, by the network device controller, the packet source address set associated with the companion index value into a first address subset and a second address subset; and
  assigning, by the network device controller, the first address subset to the service instance entry in the address table associated with the companion index value and the second address subset to an entry in the address table associated with the obtained index value and the newly added service instance; and
removing a service instance from the address table by:
  identifying, by the network device controller, a third address subset assigned to a service instance entry in the address table, associated with a first index value, for the service instance to be removed;
  identifying, by the network device controller, a fourth address subset assigned to a service instance entry in the address table associated with a second index value that is a companion index value to the first index value;
  assigning, by the network device controller, a combined address subset, comprising the third address subset and the fourth address subset, to the service instance entry in the address table associated with the second index value; and
  clearing, by the network device controller, the service instance entry associated with the first index value from the table.

3. The method of claim 2, further comprising:
determining, by the network device controller, that the first index value is less than the second index value;
changing, by the network device controller, the association for the service instance entry in the address table, associated with the second index value, from an association with the second index value to an association with the first index value.

4. The method of claim 1, wherein the number of provisioned index values in the set of provisioned index values is a power of two.

5. The method of claim 4, wherein increasing the number of index values in the set of provisioned index values comprises doubling the number of provisioned index values.

6. The method of claim 4, wherein identifying a companion index value for a particular index value comprises adding, by the network device controller, half the number of provisioned index values in the set of provisioned index values to the particular index value, modulo the number of provisioned index values in the set of provisioned index values.

7. The method of claim 1, comprising generating the address table.

8. A network device controller comprising:
memory storing an address table including a set of entries, wherein the address table has a number of entries less than or equal to a number of index values in a set of provisioned index values, and wherein each of the entries is assigned to a respective provisioned index value and an instance of a distributed service provided by a plurality of service instances; and
at least one processor, the at least one processor configured to add a new service instance to the address table by performing the operations of:
  obtaining an assignable index value to assign to the new service instance by 1) identifying an existing, unassigned, index value in the set of provisioned index values, or when no existing index values in the set of provisioned index values are unassigned, by 2) increasing the number of index values in the set of provisioned index values and selecting a newly provisioned index value;
  identifying, based on the obtained index value and the number of provisioned index values in the set of provisioned index values, an assigned index value that is a companion index value to the obtained index value, wherein the companion index value is associated with a packet source address set;
  dividing the packet source address set associated with the companion index value into a first address subset and a second address subset; and
  assigning the first address subset to the service instance entry in the address table associated with the companion index value and the second address subset to an entry in the address table associated with the obtained index value and the newly added service instance.

9. A network device controller comprising:
memory storing an address table including a set of entries, wherein the address table has a number of entries less than or equal to a number of index values in a set of provisioned index values, and wherein each of the entries is assigned to a respective provisioned index value and an instance of a distributed service provided by a plurality of service instances; and
at least one processor, the at least one processor configured to add a new service instance to the address table by performing the operations of:
obtaining an assignable index value to assign to the new service instance by 1) identifying an existing, unassigned, index value in the set of provisioned index values, or by 2) increasing the number of index values in the set of provisioned index values and selecting a newly provisioned index value;
identifying an assigned index value that is a companion index value to the obtained index value;
dividing a packet source address set associated with the companion index value into a first address subset and a second address subset; and
assigning the first address subset to the service instance entry in the address table associated with the companion index value and the second address subset to an entry in the address table associated with the obtained index value and the newly added service instance;
wherein the at least one processor is further configured to remove a service instance from the address table by performing the operations of:
identifying a third address subset assigned to a service instance entry in the address table, associated with a first index value, for the service instance to be removed;
identifying a fourth address subset assigned to a service instance entry in the address table associated with a second index value that is a companion index value to the first index value;
assigning a combined address subset, comprising the third address subset and the fourth address subset, to the service instance entry in the address table associated with the second index value; and
clearing the service instance entry associated with the first index value from the table.

10. The network device controller of claim 9, wherein the at least one processor is further configured to perform the operations of:
determining that the first index value is less than the second index value;
changing the association for the service instance entry in the address table, associated with the second index value, from an association with the second index value to an association with the first index value.

11. The network device controller of claim 8, wherein the number of provisioned index values in the set of provisioned index values is a power of two.

12. The network device controller of claim 11, wherein increasing the number of index values in the set of provisioned index values comprises doubling the number of provisioned index values.

13. The network device controller of claim 11, wherein identifying a companion index value for a particular index value comprises adding half the number of provisioned index values in the set of provisioned index values to the particular index value, modulo the number of provisioned index values in the set of provisioned index values.

14. The network device controller of claim 8, wherein the at least one processor is further configured to generate the address table.

15. Tangible computer readable media storing instructions which, when executed by one or more computing processors, cause the one or more computing processors to:
provide an address table including a set of entries, wherein:
the address table has a number of entries less than or equal to a number of index values in a set of provisioned index values, and wherein each of the entries is assigned to a respective provisioned index value and an instance of a distributed service;
add a new service instance to the address table by:
obtaining an assignable index value to assign to the new service instance by 1) identifying an existing, unassigned, index value in the set of provisioned index values, or by 2) increasing the number of index values in the set of provisioned index values and selecting a newly provisioned index value;
identifying an assigned index value that is a companion index value to the obtained index value;
dividing a packet source address set associated with the companion index value into a first address subset and a second address subset; and
assigning the first address subset to the service instance entry in the address table associated with the assigned companion index value and the second address subset to an entry in the address table associated with the obtained index value and the newly added service instance; and
remove a service instance from the address table by:
identifying a third address subset assigned to a service instance entry in the address table, associated with a first index value, for the service instance to be removed;
identifying a fourth address subset assigned to a service instance entry in the address table associated with a second index value that is a companion index value to the first index value;
assigning a combined address subset, comprising the third address subset and the fourth address subset, to the service instance entry in the address table associated with the second index value; and
clearing the service instance entry associated with the first index value from the table.

16. The computer readable media of claim 15, the instructions comprising instructions to cause the one or more processors to:
determine that the first index value is less than the second index value;
change the association for the service instance entry in the address table, associated with the second index value, from an association with the second index value to an association with the first index value.

17. The computer readable media of claim 15, wherein the number of provisioned index values in the set of provisioned index values is a power of two.

18. The computer readable media of claim 17, wherein increasing the number of index values in the set of provisioned index values comprises doubling the number of provisioned index values.

19. The computer readable media of claim 17, wherein identifying a companion index value for a particular index value comprises adding half the number of provisioned index values in the set of provisioned index values to the particular index value, modulo the number of provisioned index values in the set of provisioned index values.

20. The method of claim 2, wherein the number of provisioned index values in the set of provisioned index values is a power of two, and wherein identifying a companion index value for a particular index value comprises adding, by the network device controller, half the number of provisioned index values in the set of provisioned index values to the particular index value, modulo the number of provisioned index values in the set of provisioned index values.

21. The network device controller of claim 9, wherein the number of provisioned index values in the set of provisioned index values is a power of two, and wherein identifying a companion index value for a particular index value comprises adding half the number of provisioned index values in the set of provisioned index values to the particular index value, modulo the number of provisioned index values in the set of provisioned index values.

\* \* \* \* \*